(12) United States Patent
Kao et al.

(10) Patent No.: US 10,211,874 B2
(45) Date of Patent: Feb. 19, 2019

(54) PROTECTIVE COVER (71) Applicant: ASUSTEK COMPUTER INC., Taipei (TW)

(72) Inventors: Erh-Ting Kao, Taipei (TW); Yung-Hsiang Chen, Taipei (TW); Jack Lam, Taipei (TW); Yi-chen Yen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/855,724

(22) Filed: Dec. 27, 2017

(65) Prior Publication Data

US 2018/0191394 A1    Jul. 5, 2018

(30) Foreign Application Priority Data

Jan. 4, 2017  (CN) .......................... 2017 1 0004575

(51) Int. Cl.
| | |
|---|---|
| *H04M 1/00* | (2006.01) |
| *H04B 1/3888* | (2015.01) |
| *A45C 11/00* | (2006.01) |
| *A45C 13/10* | (2006.01) |

(52) U.S. Cl.
CPC ............ *H04B 1/3888* (2013.01); *A45C 11/00* (2013.01); *A45C 13/1069* (2013.01); *A45C 2011/003* (2013.01); *A45C 2200/15* (2013.01)

(58) Field of Classification Search
CPC .......... A45C 2011/003; A45C 2200/15; A45C 13/1069; A45C 2011/002; G06F 1/1626; G06F 1/1633; G06F 2200/1633; G06F 1/1615; G06F 1/1684; H04B 1/3888; H04B 1/3877

See application file for complete search history.

(56) References Cited

U.S. PATENT DOCUMENTS

| | | | |
|---|---|---|---|
| 2013/0140203 A1* | 6/2013 | Chiang | G06F 1/1628 206/320 |
| 2015/0266610 A1* | 9/2015 | Melmon | B65D 5/5206 206/45.23 |

FOREIGN PATENT DOCUMENTS

| | | |
|---|---|---|
| CN | 203276092 U | 11/2013 |
| CN | 104166433 A | 11/2014 |

* cited by examiner

*Primary Examiner* — Nhan T Le
(74) *Attorney, Agent, or Firm* — Muncy, Geissler, Olds & Lowe, P.C.

(57) ABSTRACT

A protective cover comprises a fixing plate, a first folding plate, a second folding plate, and a third folding plate. The fixing plate is fixed connected to a back surface of an electronic device and includes a first magnetic component. The first folding plate is foldably connected to the fixing plate and attaches to the back surface by a first attaching force. The second folding plate is foldably connected to the fixing plate and attaches to the back surface by a second attaching force. The third folding plate is foldably connected to the second folding plate and includes a second magnetic component to attach to the back surface. When the protective cover is folded, the third folding plate, the second folding plate, and the first folding plate leave the back surface in sequence; the fixing plate, the first folding plate, and the second folding plate form a support state.

10 Claims, 11 Drawing Sheets

PROTECTIVE COVER

CROSS-REFERENCE TO RELATED APPLICATION

This application claims the priority benefit of China application serial No. 201710004575.4, filed on Jan. 4, 2017. The entirety of the above-mentioned patent application is hereby incorporated by reference herein and made a part of specification.

BACKGROUND OF THE INVENTION

Field of the Invention
The disclosure relates to a protective cover.
Description of the Related Art
Generally speaking, protective covers are configured to support tablet computers for convenience. Most protective covers support tablet computers at different standing states by folding different parts of the protective covers. However, the folding steps are time-consuming, which is not convenient for users.

In addition, some auxiliary supports may be used to support the tablet computer at different support states. However, since the auxiliary support is not attached to the tablet computer, it is not easy for usage.

BRIEF SUMMARY OF THE INVENTION

A protective cover, adapted to an electronic device, the electronic device includes a back surface. The protective cover comprises a fixing plate, a first magnetic component, a first folding plate, a second folding plate, and a third folding plate. The fixing plate is fixed to the back surface. The first magnetic component is configured at the fixing plate. The first folding plate is foldably connected to the fixing plate and configured to be attached to the back surface via a first attaching force. The second folding plate is foldably connected to the fixing plate and configured to be attached to the back surface via a second attaching force. The third folding plate is foldably connected to the second folding plate. A second magnetic component is configured at the back surface. When the third folding plate is folded under an external force, the third folding plate, the second folding plate, and the first folding plate leave the back surface in sequence, and then the first magnetic component and the second magnetic component are attracted with each other, and the third folding plate is folded to be attached to the fixing plate to support the electronic device.

In conclusion, since the attaching force of the first folding plate and the second folding plate attaching to the electronic device are different, when the protective cover of the electronic device is folded under an external force, the third folding plate, the second folding plate, and the first folding plate are folded automatically in sequence. Then, the third folding plate is folded to attach to the fixing plate to form a triangle supporting structure automatically. The electronic device can be supported conveniently.

These and other features, aspects and advantages of the present disclosure will become better understood with regard to the following description, appended claims, and accompanying drawings.

DETAILED DESCRIPTION OF THE EMBODIMENTS

Figure 1:
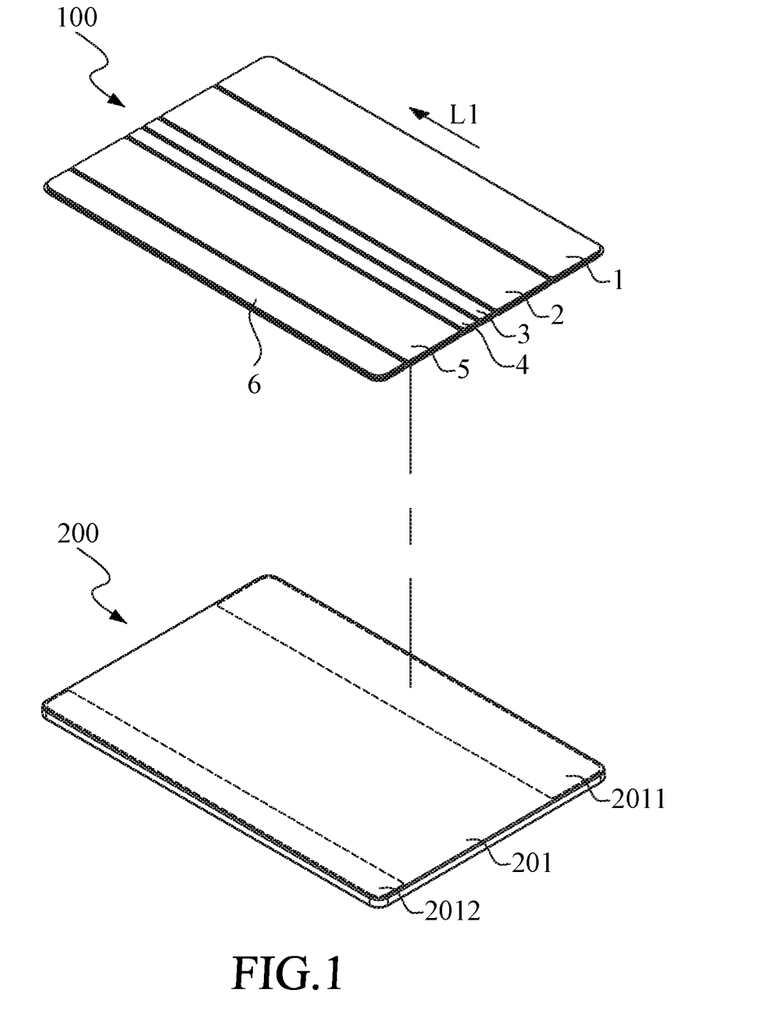
FIG. 1 is an exploded schematic diagram of a protective cover of an electronic device and an electronic device according to an embodiment of the disclosure.
Figure 2:
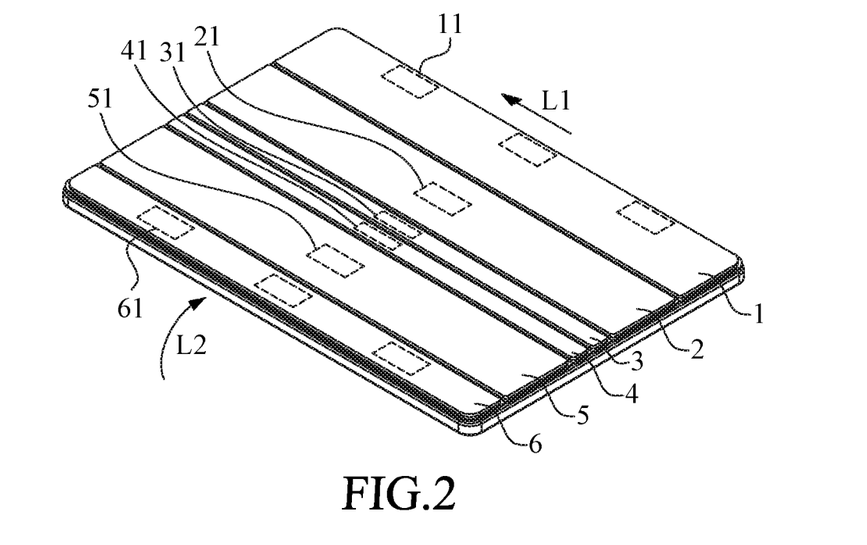
FIG. 2 is an exploded schematic diagram of a protective cover of the electronic device and the electronic device according to an embodiment of the disclosure.

Please refer to FIG. 1 and FIG. 2. FIG. 1 is an exploded schematic diagram of a protective cover of an electronic device and an electronic device according to an embodiment of the disclosure. FIG. 2 is an exploded schematic diagram of the protective cover of the electronic device and the electronic device according to an embodiment of the disclosure.

As shown in figures, a protective cover of the electronic device 100 includes a fixing plate 1, a first folding plate 2, a first auxiliary plate 3, a second auxiliary plate 4, a second folding plate 5, and a third folding plate 6. The protective cover of the electronic device 100 is configured to cover a back surface 201 of the electronic device 200. For example, the back surface 201 is a magnetic metal plate.

The fixing plate 1 extends along an extending direction L1. The fixing plate 1 is fixed to a fixing region 2011 diposed at an end of the back surface 201. The fixing plate 1 includes a first magnetic component 11.

The first folding plate 2 is foldably connected to the fixing plate 1 along an extending direction L1. The first folding plate 2 includes a second magnetic component 21. The first folding plate 2 is attached to the back surface 201 via a first attaching force of the second magnetic component 21. The attaching force is generated due to the magnetic attraction between the second magnetic component 21 and the back surface 201.

The first auxiliary plate 3 is foldably connected to the first folding plate 2 along the extending direction L1. The first auxiliary plate 3 includes a third magnetic component 31. The first auxiliary plate 3 is attached to the back surface 201 via a third attaching force of the third magnetic component 31. The third attaching force is less than the first attaching force.

The second auxiliary plate 4 is foldably connected to the first auxiliary plate 3 along the extending direction L1. The second auxiliary plate 4 includes a fourth magnetic component 41. The second auxiliary plate 4 is attached to the back surface 201 via a fourth attaching force of the fourth magnetic component 41. The fourth attaching force is less than the third attaching force.

The second folding plate 5 is foldably connected to the second auxiliary plate 4 along the extending direction L1. The second folding plate 5 is foldably connected to the first folding plate 2 via the second auxiliary plate 4 and the first auxiliary plate 31 along the extending direction L1. The second folding plate 5 includes a fifth magnetic component 51. The second folding plate 5 is attached to the back surface 201 via a second attaching force of the fifth magnetic component 51. The second attaching force is less than the first attaching force, the third attaching force, and the fourth attaching force.

The third folding plate 6 is foldably connected to the second folding plate 5 along the extending direction L1. The third folding plate 6 includes a sixth magnetic component 61 corresponding to the first magnetic component 11. The third folding plate 6 is attached to the attaching region 2012 of the back surface 201 via the magnetic attraction force of the sixth magnetic component 61. The attaching region 2012 is located at the other end of the back surface 201 opposite to the fixing region 2011.

Figure 3:
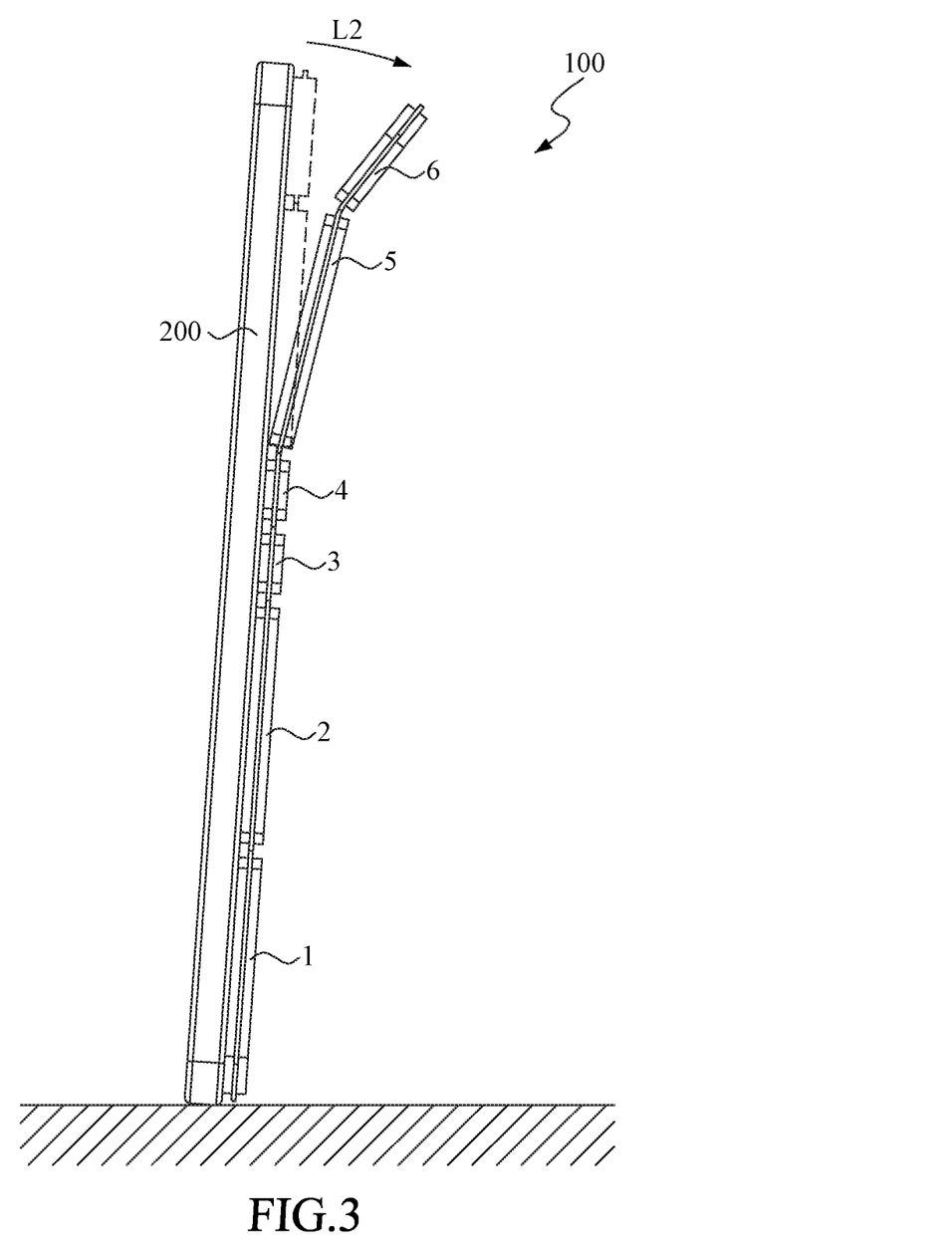
FIG. 3 is a plan schematic diagram showing a state that a third folding plate of the protective cover of the electronic device is folded downwardly and a second folding plate is driven to leave the back surface of the electronic device according to an embodiment of the disclosure.

Please refer to FIG. 3. FIG. 3 is a plan schematic diagram showing a state that a third folding plate of the protective cover of the electronic device is folded downwardly and a second folding plate is driven to leave the back surface of the electronic device according to an embodiment of the disclosure.

When the third folding plate 6 is folded along a folding direction L2 perpendicular to the extending direction L1 under an external force, the third folding plate 6 leaves the attaching region 2012 of the back surface 201 of the electronic device 200. Since the second folding plate 5 connected with the third folding plate 6 is attached to the back surface 201 via the second attaching force at the time, the third folding plate 6 rotates around the connecting part between the third folding plate 6 and the second folding plate 5 and falls down along the folding direction L2.

A first gravity of the third folding plate 6 is provided. Since the first gravity overcomes the second attaching force, the second folding plate 5 is pulled to rotate around the connecting part between the second folding plate 5 and the second auxiliary plate 4. Then, the second folding plate 5 falls down along the folding direction L2 and leaves the back surface 201.

In detail, when the third folding plate 6 leaves the back surface 201 under the external force, the third folding plate 6 generates an inertia moment. Thus, the third folding plate 6 continues rotating along the folding direction L2. At the time, since the sum of the inertia moment and the gravity moment of the third folding plate 6 is greater than the anti-folding moment which is generated by the second attaching force at a direction opposite to the folding direction L2. Consequently, the second folding plate 5 is folded downwardly.

Figure 4:
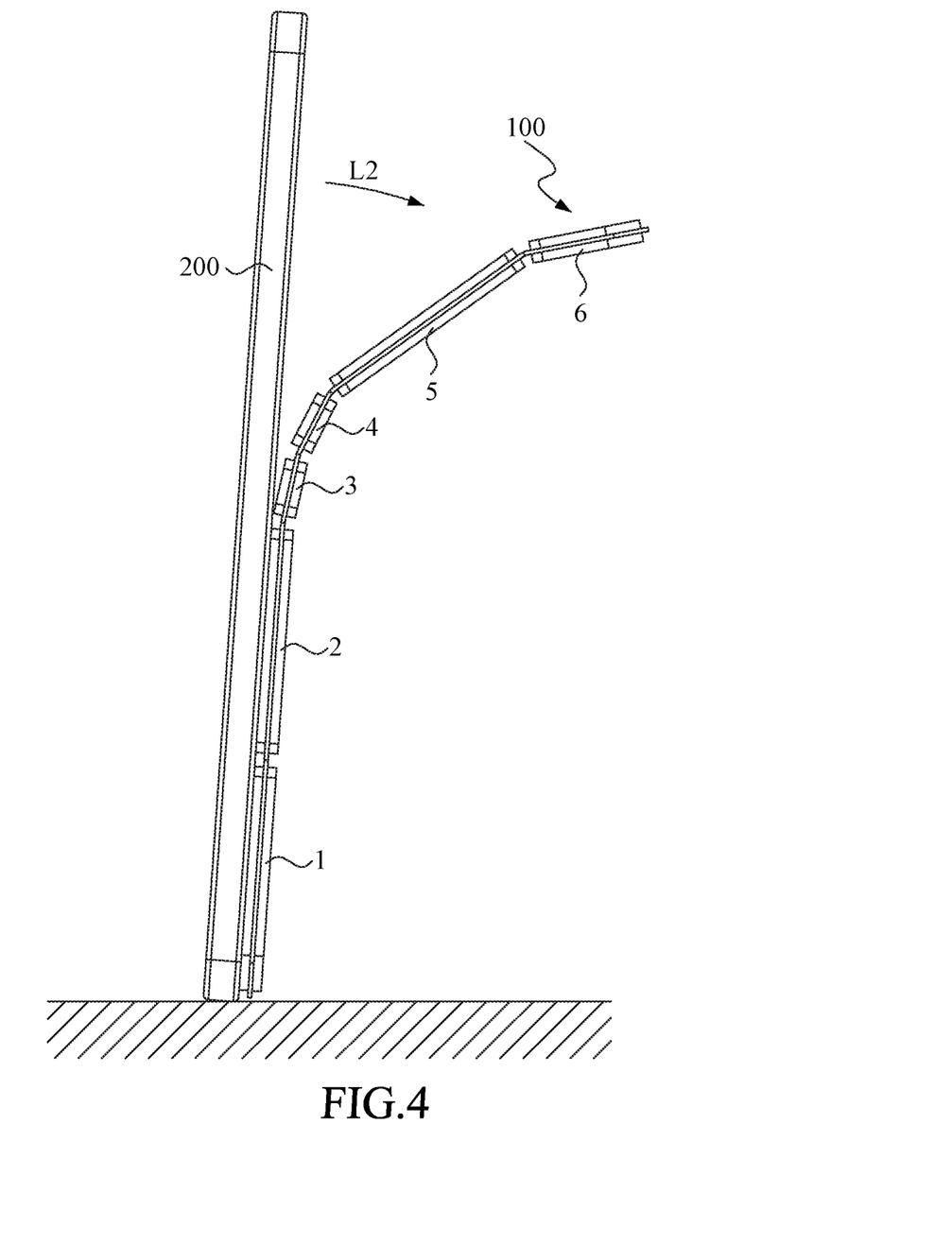
FIG. 4 is a plan schematic diagram showing a state that the third folding plate and the second folding plate of the protective cover of the electronic device are folded downwardly and a second auxiliary plate and a first auxiliary plate are driven to leave the back surface of the electronic device according to an embodiment of the disclosure.

Please refer to FIG. 4. FIG. 4 is a plan schematic diagram showing a state that the third folding plate and the second folding plate of the protective cover of the electronic device are folded downwardly and a second auxiliary plate and a first auxiliary plate are driven to leave the back surface of the electronic device according to an embodiment of the disclosure. As shown in FIG. 4, when the second folding plate 5 is driven by the third folding plate 6 and falls down, the second folding plate 5 rotates around the connecting part between the second auxiliary plate 4 and the first auxiliary plate 3 to fall down along the folding direction L2.

Furthermore, a second gravity is provided via the second folding plate 5. Since the sum of the second gravity provided by the second folding plate 5 and the first gravity provided by the third folding plate 6 is greater than the fourth attaching force, the second auxiliary plate 4 is driven to rotate around the connecting part between the second auxiliary plate 4 and the first auxiliary plate 3 along the folding direction L2.

In a similar way, the second gravity provided by the second folding plate 5 generates a gravity moment. The sum of the gravity moment generated by the second folding plate 5, the gravity moment generated by the third folding plate 6, and the inertia moment of the external force is greater than the fourth attaching force, and thus the second auxiliary plate 4 is driven to fall down.

After the second auxiliary plate 4 leaves the back surface 201, when the sum of the second auxiliary gravity provided by the second auxiliary plate 4, the second gravity provided by the second folding plate 5, and the first gravity provided by the third folding plate 6 overcomes the third attaching force, the first auxiliary plate 3 rotates around the connecting part between the first auxiliary plate 3 and the first folding plate 2 and is folded downwardly along the folding direction L2. Then, the first auxiliary plate 3 is pulled down by the second auxiliary plate 4 to leave the back surface 201. The principle of the movement of the first auxiliary plate 3 is the same as that of the second auxiliary plate 4 and the second folding plate 5 which are folded by the inertia moment, the gravity moment, or the combination, which is not repeated herein.

Figure 5:
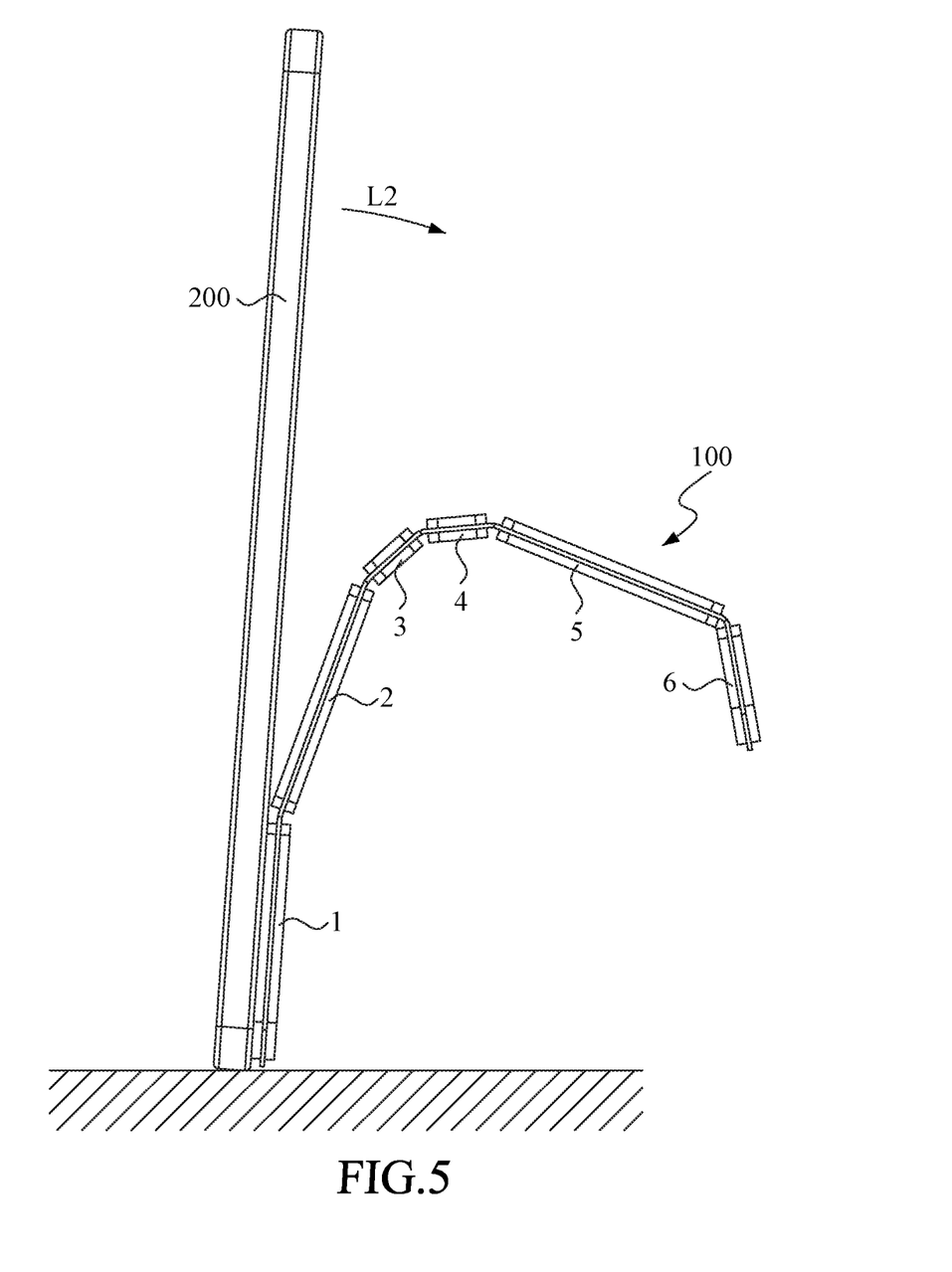
FIG. 5 is a plan schematic diagram of the third folding plate, the second folding plate, the second auxiliary plate, and the first auxiliary plate of the protective cover of the electronic device are folded downwardly and a first folding plate to is driven to leave the back surface of the electronic device according to an embodiment of the disclosure.
Figure 6:
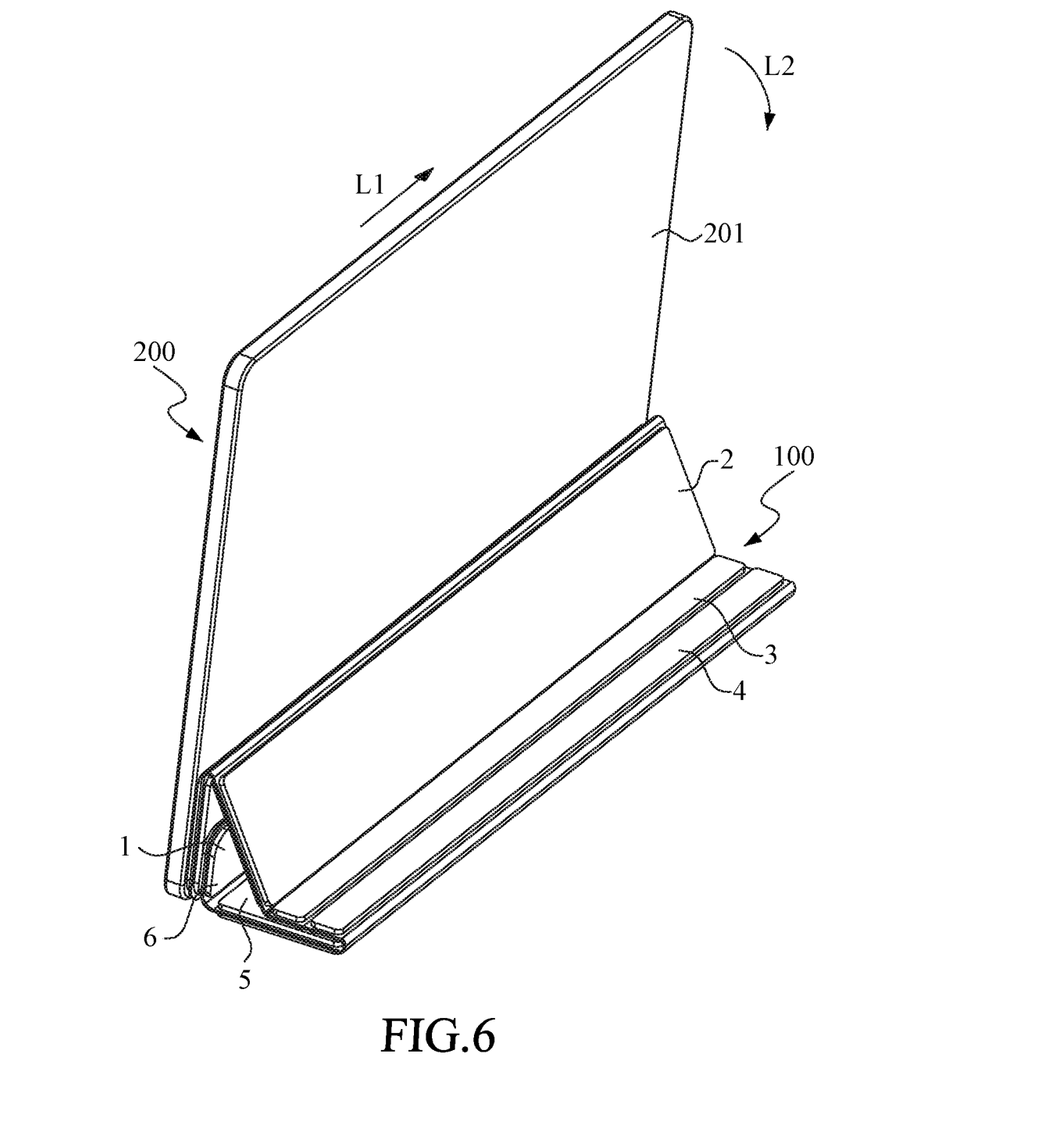
FIG. 6 is a schematic diagram of a triangle supporting state of a protective cover of an electronic device under an external force according to an embodiment of the disclosure.

Please refer to FIG. 5 and FIG. 6. FIG. 5 is a plan schematic diagram of the third folding plate, the second folding plate, the second auxiliary plate, and the first auxiliary plate of the protective cover of the electronic device are folded downwardly and a first folding plate to is driven to leave the back surface of the electronic device according to an embodiment of the disclosure. FIG. 6 is a schematic diagram of a triangle supporting state of a protective cover of an electronic device under an external force according to an embodiment of the disclosure.

As shown in FIG.5 and FIG.6, after the first auxiliary plate 3 leaves the back surface 201, the first auxiliary plate 3 provides a first auxiliary gravity. When the sum of the first auxiliary gravity provided by the first auxiliary plate 3, the second auxiliary gravity provided by the second auxiliary plate 4, the second gravity provided by the second folding plate 5, and the first gravity provided by and the third folding plate 6 is greater than the first attaching force, the first folding plate 2 rotates around the connecting part between the first folding plate 2 and the fixing plate 1 and falls down along the folding direction L2.

The principle of the movement of the first folding plate 2 is the same as that of the second auxiliary plate 4 and the second folding plate 5 which are folded by the inertia moment, the gravity moment, or the combination, which is not repeated here.

Since the second folding plate 5, the second auxiliary plate 4, and the first auxiliary plate 3 are configured between the third folding plate 6 and the first folding plate 2, the turning radius of the third folding plate 6 relating to the first folding plate 2 is large. Therefore, when the first folding plate 2 is pulled by the first auxiliary plate 3, the second auxiliary plate 4, the second folding plate 5, and the third folding plate 6 and falls away from the back surface 201, the third folding plate 6 is rotated along the folding direction L2 by almost a full turn.

The sixth magnetic component 61 is configured at the third folding plate 6, and the first magnetic component 11 is configured at the fixing plate 1, respectively. As a result, after the third folding plate 6 is rotated about a full turn, the sixth magnetic component 61 is very close to the first magnetic component 11. Then, the third folding plate 6 is attached to the fixing plate 1 via the magnetic attractive force between the sixth magnetic component 61 and the first magnetic component 11. As a result, the first folding plate 2, the second folding plate 5, and the fixing plate 1 form a triangle supporting state to support the electronic device 200 at a first stand state.

In addition, the third magnetic component 31 is configured at the first auxiliary plate 3, and the fourth magnetic component 41 is configured at the second auxiliary plate 4, respectively. Consequently, when the third folding plate 6 is attached to the fixing plate 1, the first auxiliary plate 3 and the second auxiliary plate 4 are attached to the second folding plate 5 via the third magnetic component 31 and the fourth magnetic component 41 to form the triangle supporting state.

Figure 7:
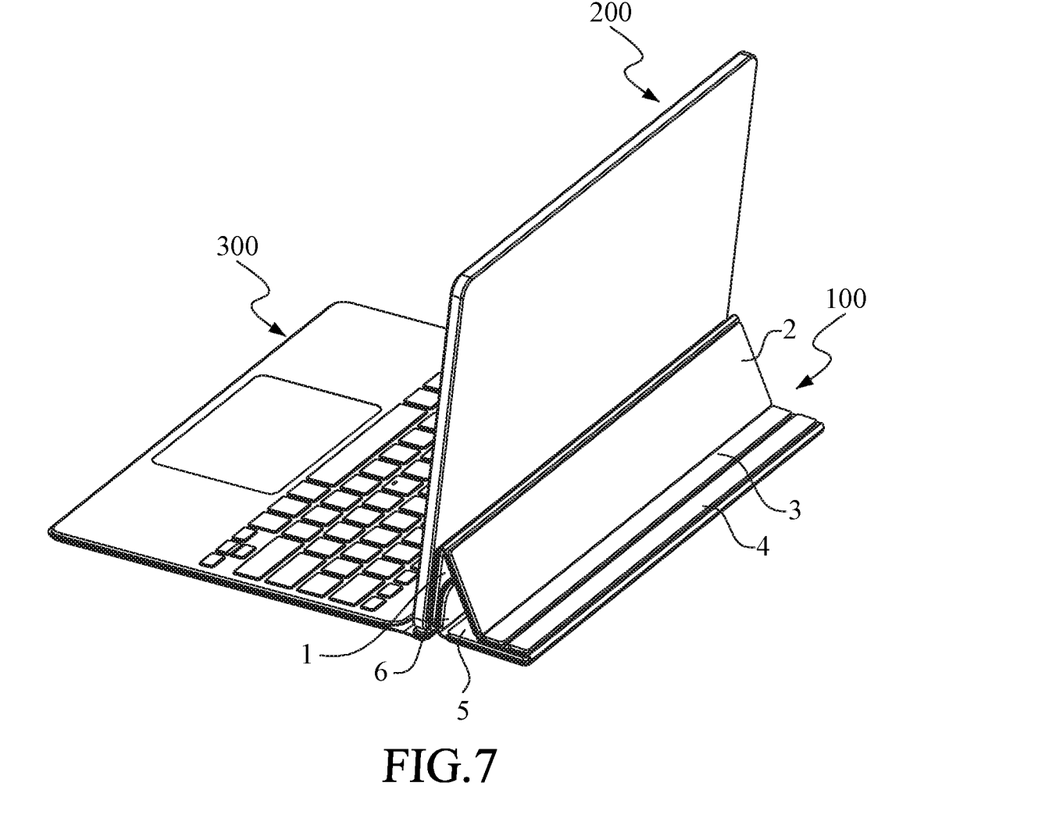
FIG. 7 is a schematic diagram of an electronic device supported by a protective cover in a triangle supporting state according to an embodiment of the disclosure.

Please continue to refer to FIG. 7. FIG. 7 is a schematic diagram of an electronic device supported by a protective cover in a triangle supporting state according to an embodiment of the disclosure. As shown in FIG. 7, when the protective cover of the electronic device 100 forms a triangle supporting state to support the electronic device 200 at the first stand state, an external keyboard 300 is connected to the electronic device 200.

Figure 8:
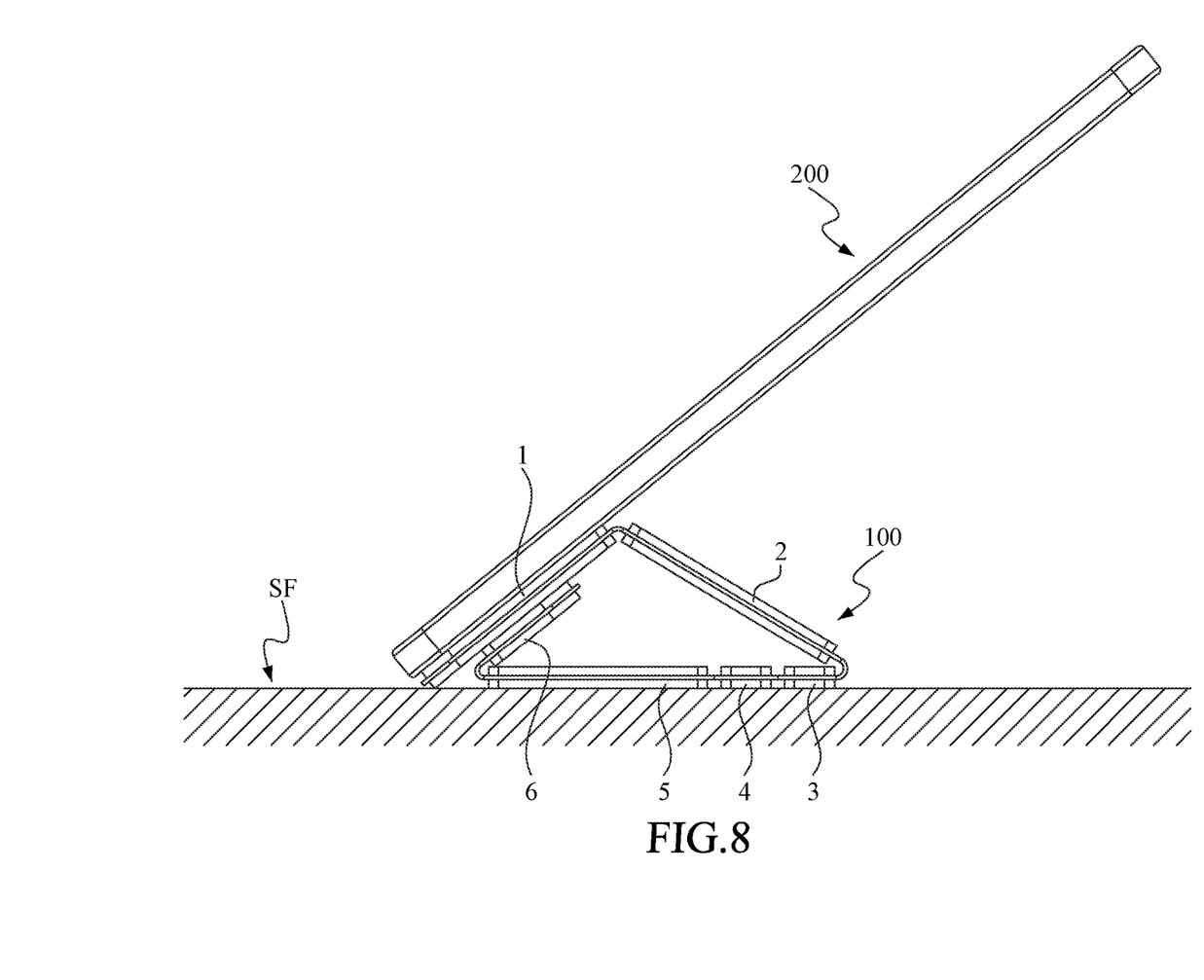
FIG. 8 is plan schematic diagram showing that an electronic device is supported by a protective cover at a triangle supporting state according to an embodiment of the disclosure.

Please continue to refer to FIG. 8. FIG. 8 is plan schematic diagram showing that an electronic device is supported by a protective cover at a triangle supporting state according to an embodiment of the disclosure. As shown in FIG. 8, except for the first stand state, the protective cover 100 of the electronic device is supported at a second stand state. In detail, when the first folding plate 2 is pulled outwardly from the original triangle supporting state in FIG. 7, the first auxiliary plate 3 and the second auxiliary plate 4 moves from the state of attaching to the second folding plate 5 to the state of attaching to the placement surface SF.

Then, the first auxiliary plate 3 and the second auxiliary plate 4 locate at a same surface as that of the second folding plate 5. Another triangle supporting state is formed to support the electronic device 200 at a second stand state. The electronic device has a larger incline angle at the second stand state than that in the first stand state.

Figure 9:
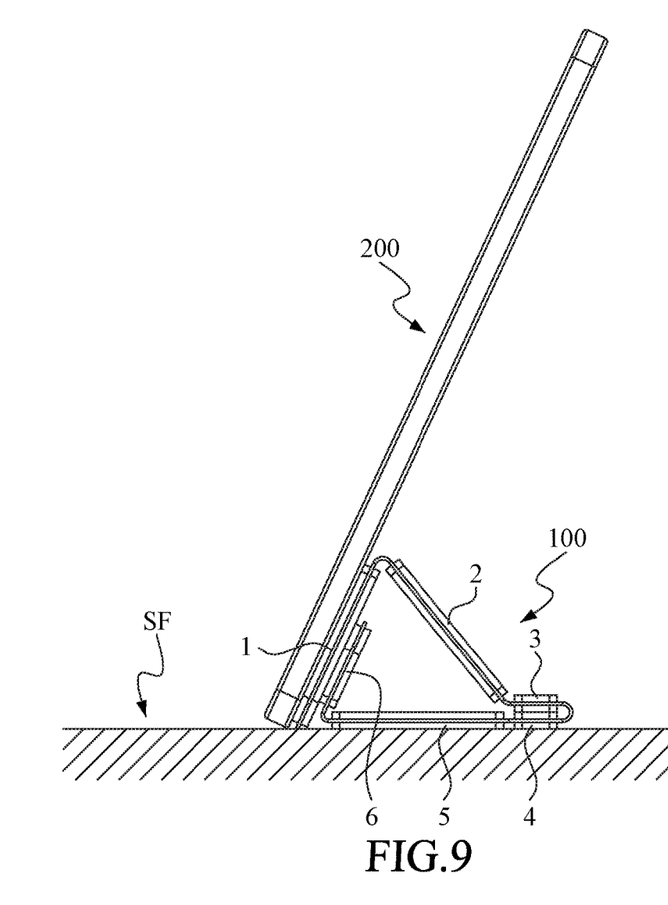
FIG. 9 is plan schematic diagram showing that an electronic device supported by the protective cover at a triangle supporting state according to an embodiment of the disclosure.

Please continue to refer to FIG. 9. FIG. 9 is plan schematic diagram showing that an electronic device supported by the protective cover at a triangle supporting state according to an embodiment of the disclosure. Except for the first stand state and the second stand state, the protective cover 100 of the electronic device is supported at a third stand state. In detail, when the first auxiliary plate 3 and the second auxiliary plate 4 are folded and overlapped as shown in FIG. 9, the fixing plate 1, the first folding plate 2, and the second folding plate 5 form another triangle supporting state to support the electronic device 200 at the third stand state. The incline angle of the electronic device is between that of the first stand state and that of the second stand state.

Figure 10:
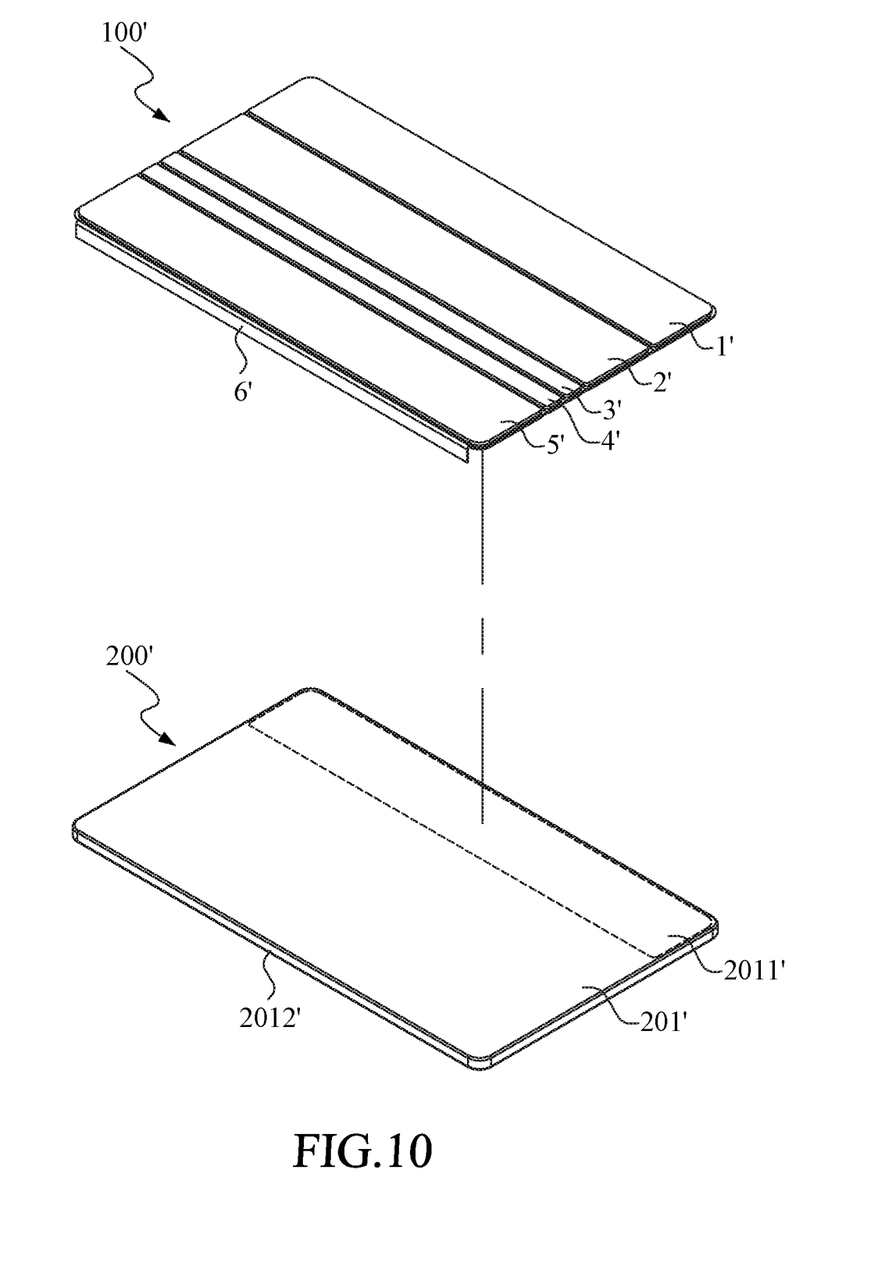
FIG. 10 is an exploded schematic diagram of a protective cover of an electronic device and an electronic device according to an embodiment of the disclosure.
Figure 11:
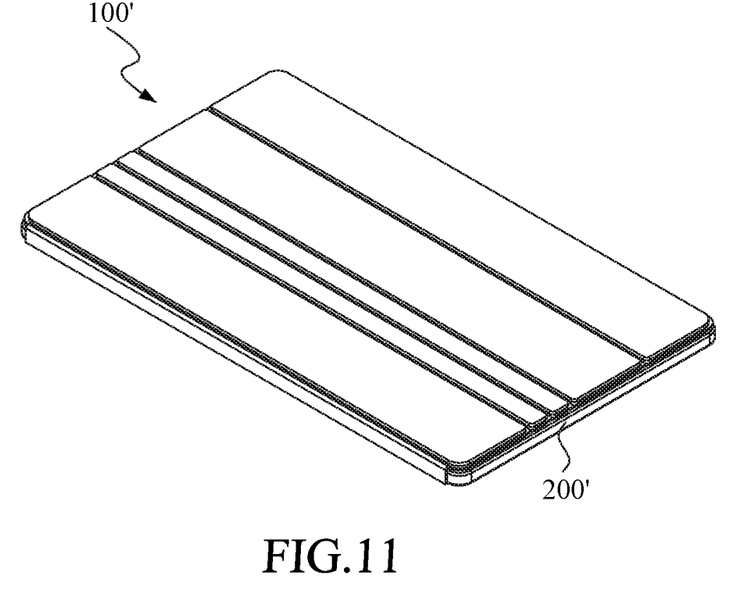
FIG. 11 is a schematic diagram showing that a protective cover of an electronic device is assembled with the electronic device according to an embodiment of the disclosure.

Please refer to FIG. 10 and FIG. 11. FIG. 10 is an exploded schematic diagram of a protective cover of an electronic device and an electronic device according to an embodiment of the disclosure. FIG. 11 is a schematic diagram showing that a protective cover of an electronic device is assembled with the electronic device according to an embodiment of the disclosure.

As shown in FIG. 10 and FIG. 11, a protective cover 100' of the electronic device includes a fixing plate 1', a first folding plate 2', a first auxiliary plate 3', a second auxiliary plate 4', a second folding plate 5', and a third folding plate 6'. The difference between the protective cover of the electronic device 100' and the protective cover of the electronic device 100 is that the third folding plate 6' of the protective cover of the electronic device 100' is attached to a side surface 2012' of the electronic device 200'. The side surface 2012' is adjacent to the back surface 201'. Therefore, not only the fixing plate 1' is fixed the fixing region 2011' at the back surface 201' of the electronic device 200', the second folding plate 5' and the third folding plate 6' are fastened to the electronic device 200' when the third folding plate 6' is attached to the side surface 2012'.

In conclusion, the protective cover of the electronic device in embodiments includes a fixing plate, a first folding plate, a second folding plate, and a third folding plate. The fixing plate is fixed to a fixing region at a back surface of the electronic device. The third folding plate is attached to an attaching region opposite to the fixing region. The attaching force of the third folding plate, the first folding plate, and the second folding plate attaching to the electronic device are different. Therefore, when the third folding plate is folded under an external force, the second folding plate and the first folding plate are folded automatically in sequence under the inertia moment of the external force and the gravity moment of folding plates, respectively. Then, the third folding plate is folded to attach to the fixing plate to form a triangle supporting structure. Thus, the electronic device can be supported conveniently.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A protective cover, adapted to an electronic device, the electronic device includes a back surface, the protective cover comprising:
   a fixing plate fixed to the back surface, a first magnetic component is configured at the fixing plate;
   a first folding plate, foldably connected to the fixing plate and is configured to be attached to the back surface via a first attaching force;
   a second folding plate, foldably connected to the fixing plate and is configured to be attached to the back surface via a second attaching force; and
   a third folding plate, foldably connected to the second folding plate, a second magnetic component is configured at the back surface;

wherein when the third folding plate is folded under an external force, the third folding plate, the second folding plate, and the first folding plate leave the back surface in sequence, and then the first magnetic component and the second magnetic component are attracted with each other, and the third folding plate is folded to be attached to the fixing plate to support the electronic device.

2. The protective cover of the electronic device according to claim 1, further comprising a first auxiliary plate configured between the first folding plate and the second folding plate and foldably connected with the first folding plate and the second folding plate.

3. The protective cover of the electronic device according to claim 2, wherein the first auxiliary plate is attached to the back surface via a third attaching force which is less than the first attaching force and greater than the second attaching force.

4. The protective cover of the electronic device according to claim 3, wherein the first attaching force, the second attaching force, and the third attaching force are magnetic attraction forces.

5. The protective cover of the electronic device according to claim 3, further comprising a second auxiliary plate configured between the first auxiliary plate and the second folding plate and foldably connected with the first auxiliary plate and the second folding plate along an extending direction.

6. The protective cover of the electronic device according to claim 5, wherein the second auxiliary plate is attached to the back surface via a fourth attaching force which is less than the third attaching force and greater than the second attaching force.

7. The protective cover of the electronic device according to claim 6, wherein the first attaching force, the second attaching force, the third attaching force, and the fourth attaching force are magnetic attraction forces.

8. The protective cover of the electronic device according to claim 1, wherein the first attaching force and the second attaching force are magnetic attraction forces.

9. The protective cover of the electronic device according to claim 1, wherein the back surface of the electronic device includes a fixing region and an attaching region located at two ends of the back surface, respectively, the fixing plate is fixed to the fixing region, and the third folding plate is attached to the attaching region.

10. The protective cover of the electronic device according to claim 1, wherein a fixing region is located at an end of the back surface of the electronic device, and an attaching region is located at a side surface of the electronic device adjacent to the back surface, the fixing plate is fixed connected to the fixing region, and the third folding plate is attached to the attaching region.

* * * * *